United States Patent Office 3,804,791
Patented Apr. 16, 1974

3,804,791
POLYAMIDE SPINNING DOPE
Paul Winthrop Morgan, West Chester, Pa., assignor to E. I. du Pont de Nemours and Company, Wilmington, Del.
No Drawing. Filed Oct. 27, 1972, Ser. No. 301,289
Int. Cl. C08g *51/44, 51/46*
U.S. Cl. 260—30.8 R                4 Claims

ABSTRACT OF THE DISCLOSURE

An anisotropic dope comprising a polyamide in concentrated sulfur acid within the concentration range of about 96–104% $H_2SO_4$, said polyamide consisting essentially of recurring units of the formula:

—HN—$R_1$—NHCO—$R_2$—CO— wherein $R_1$ is divalent organic radical selected from the group of 1,4 - phenylene; trans-1,4-cyclohexylene; 4,4'-azodiphenylene; 4,4'-azoxydiphenylene; and 4,4'-carbonamidodiphenylene; $R_2$ is a divalent organic radical selected from the group of 1,4 - phenylene; trans - 1,4-cyclohexylene; 2,5 - pyridylene; 4,4' - azodiphenylene; being a radical selected from the group of 4,4'-azodiphenylene and 4,4'-azoxydiphenylene.

---

This invention relates to novel, optionally anisotropic sulfuric acid dopes of film- and fiber-forming polyamides whose repeating structural unit contains at least one radical selected from the group of azo and azoxy radicals. Also provided by this invention are high strength fibers of these polyamides.

BACKGROUND OF THE INVENTION

Azo and azoxy polyamides are described in, e.g., Blake et al. U.S. 2,994,693; Agolini U.S. 3,642,709; and the following patents of Bach: U.S. 3,501,444; U.S. 3,598,768; and U.S. 3,660,361. Optically anisotropic sulfuric acid dopes of film- and fiber-forming aromatic polyamides are described in Kwolek U.S. 3,671,542.

SUMMARY OF THE INVENTION

This invention provides novel, optically anisotropic film- and fiber-forming dopes comprising (1) polyamides consisting essentially of recurring units of the formula:

(I)     —HN—$R_1$—NHCO—$R_2$—CO— wherein $R_1$ is a divalent organic radical selected from the group of 1,4-phenylene; trans-1,4-cyclohexylene; 4,4'-azodiphenylene; 4,4'-azoxydiphenylene; and 4,4'-carbonamidodiphenylene; $R_2$ is a divalent organic radical selected from the group of 1,4-phenylene; trans-1,4-cyclohexylene; 2,5-pyridylene; 4,4'-azodiphenylene; and 4,4'-azoxydiphenylene; and wherein each of ring radicals $R_1$ and $R_2$ may bear substituents selected from the group of chloro, fluoro, and bromo atoms and methyl and methoxy radicals; and wherein at least one of $R_1$ and $R_2$ is a radical selected from the group of 4,4'-azodiphenylene and 4,4'-azoxydiphenylene; and (2) concentrated sulfuric acid within the concentration range of about 96–104% $H_2SO_4$, preferably about 99.5–102%.

Preferably, Formula I polyamides are prepared by the reaction between diamines of the formula (I–A)              $H_2N$—$R_1$—$NH_2$ and diacid chlorides of the formula (I–B)              

wherein $R_1$ and $R_2$ have the significance set forth hereinabove.

Useful in the dopes of this invention are copolyamides which may be prepared by replacing up to about 90 mole percent of azo- and/or azoxy-linked Formulae I–A and I–B diamines and diacid chlorides, respectively, with aromatic diamines and diacid chlorides corresponding to Formulae II–A and II–B.

(II–A)              $H_2N$—$R_3$—$NH_2$ and (II–B)              ClCO—$R_4$—COCl wherein $R_3$ and $R_4$ are divalent aromatic radicals selected from the group of 1,4-phenylene; 4,4'-biphenylene; 1,4-, 1,5-, and 2,6-naphthylene and wherein $R_3$ and $R_4$ may bear substituents selected from the group of chloro, bromo, and fluoro atoms and methyl and methoxy radicals.

Additionally, up to a total of about 10 mole percent of the repeating units in the useful copolyamides of this invention may be derived from reactants which do not conform of the Formula I–A, IB, II–A, or II–B. These reactants, used in appropriate amounts, may be meta-oriented aromatic diamines and diacid chlorides (e.g., meta-phenylenediamine or isophthaloyl chloride); polyamide-forming aromatic monomers possessing both amine and acid chloride groups (e.g., para-aminobenzoyl chloride hydrochloride); diamines and diacid chlorides characterized by ring-atom-ring structures [e.g., bis(4-aminophenyl)ether and bis(4-chlorocarbonyl phenyl)ether]; and aliphatic diacid chlorides characterized by 4–12 carbon atoms (e.g., adipyl chloride, sebacyl chloride).

Useful Formula I polyamides and copolyamide modifications thereof exhibit inherent viscosity values of at least about 1.0, preferably 2.0 or higher, measured as described hereinafter.

This invention also provides novel high strength fibers of Formula I polyamides and copolyamide modifications thereof, as described above. In particular, as-extruded fibers exhibit unusually high levels of tensile properties.

DESCRIPTION OF THE PREFERRED EMBODIMENTS

Useful polyamides and copolyamides

The polyamides and copolyamides useful in this invention may be prepared by low temperature solution polymerization processes similar to those described in, e.g., Kwolek—U.S. 3,063,966. In this process, a cooled (e.g., with ice, ice-water, solid carbon dioxide) stirred solution of a Formula I–A diamine, or mixture thereof with suitable comonomeric diamine(s), is formed in a basic solvent system, e.g., a mixture of hexamethylphosphoramide (HMPA) and N-methylpyrrolidone - 2 (NMP). Other useful media are HMPA alone, N,N-dimethylacetamide (DMAc), N,N,N',N'-tetramethylurea (TMU), and mixtures thereof. The desired Formula I–B diacid chloride, or mixture thereof with a suitable comonomer, e.g., terephthaloyl chloride, is then added rapidly to the diamine solution. The diacid chlorides need not be mixed prior to their addition to the diamine solution, but may be added separately. The reaction mixture may be stirred and/or allowed to stand until the desired degree of polymerization has been achieved. Frequently, the reaction mixture becomes a difficultly stirrable mass within a relatively short period of time after addition of the acid chlorides. It is convenient to obtain the polymeric product by combining the reaction mixture, e.g., as a viscous solution or solid mass, with a polymer nonsolvent, e.g., water, after which the polymer is collected by filtration, washed (e.g., with water, acetone, alcohol), and dried prior to being dissolved to form the dopes of this invention. During polymerization, the acidic hydrogen chloride by-product generated by the condensation reaction may be neutralized by adding to the reaction mixture a suitable neutralizing agent, e.g., lithium carbonate.

The useful polyamides and copolyamides may also be prepared by conventional interfacial polymerization techniques. For example, to a stirred combination of water, the diamine, an inorganic base (e.g., sodium carbonate), and a water immiscible liquid is added the diacid chloride dissolved in the same water-immiscible liquid. After the reaction has been completed, the contents of the reaction vessel are combined with a polymer nonsolvent. The precipitated polymer is collected, washed, and dried, as shown above. Alternatively, selected water-miscible or partially water-miscible solvents, e.g., tetrahydrofuran or cyclohexanone, may be used in an interfacial system.

Formula I-A diamines useful for preparing the polyamides and copolyamides from which the dopes of this invention are prepared include:

p,p′-diaminobenzanilide;
2-methoxy-5-methyl-4,4′diaminoazobenzene;
p-phenylenediamine;
trans-1,4-diamino-cyclohexane;
p,p′-diaminoazobenzene;
chloro-p-phenylenediamine;
3,3′-dimethyl-4,4′-diaminobiphenyl;
p,p′-diaminoazoxybenzene;
3,3′-dimethyl-4,4′-diaminoazobenzene;
3,3′-dimethyl-4,4′-diaminoazoxybenzene;
2-2′-dimethyl-4,4′-diaminoazoxybenzene.

Formula I-B diacid chlorides useful for preparing the polyamides and copolyamides for the dopes of this invention include terephthaloyl chloride; chloroterephthaloyl chloride; p,p′-azodibenzoyl chloride; p,p′-azoxydibenzoyl chloride; 4,4′-dibenzoyl chloride; 2,5-pyridinedicarboxylic acid chloride; trans-1,4-cyclohexane dicarboxylic acid chloride; 3,3′-dibromo-4,4′-azobenzene dicarbonyl chloride; and 3,3′-dichloro-4,4′-azobenzene dicarbonyl chloride.

Preferred Formulae II-A and II-B diamines and diacid chlorides are p-phenylene diamine, benzidine, chloro-, bromo-, and fluoro-p-phenylene diamine, 3,3′-dimethylbenzidine, 1,4-, 1,5-, 2,6-naphthalene diamines and terephthaloyl chloride, 4,4′-bibenzoyl chloride, and 1,4-, 1,5-, and 2,6-naphthalene dicarbonyl chlorides.

Preferred Formula I polyamides and copolyamide modifications thereof include poly(p-phenylene p,p′-azodibenzamide), poly(p,p′-carbonamidodiphenylene p,p′-azodibenzamide), copoly-(p,p′-carbonamidodiphenylene terephthalamide/p,p′-azobenzamide) (50/50), and poly-(p,p′-azodiphenylene terephthalamide). Other polyamides and copolyamides useful in this invention include poly-(p,p′-azodiphenylene chloroterephthalamide), poly(chloro-p-phenylene p,p′-azodibenzamide), poly(p,p′-azodiphenylene 2,5-pyridine dicarboxamide), poly(p,p′-azodiphenylene 2,6-naphthalamide), and copoly(p,p′-azodiphenylene/m-phenylene terephthalamide) (90/10).

The useful Formula I polyamides and copolyamide modifications thereof exhibit inherent viscosity values of at least about 1.0, and preferably 2.0 and higher, measured as described hereinafter.

In preparation of the polyamides and copolyamides useful in this invention, chain terminators may be used. Among suitable chain terminators are compounds which can react monofunctionally with the acid chloride ends of these polymers, such as ammonia, ethylamine, dimethylamine, diethylamine, aniline, etc. Other terminators include hydoxylic compounds such as methyl alcohol, ethyl alcohol, isopropyl alcohol, and phenol. Useful terminators which react monofunctionally with the amine ends of these polymer chains include acid chlorides, e.g., acetyl chloride, acid anhydrides, e.g., acetic anhydride, and isocyanates, e.g., phenyl isocyanate.

Useful solvents

The preferred solvent for preparing the anisotropic dopes of this invention is concentrated sulfuric acid within the concentration range of about 96–104%, preferably 99.5–102%. Other useful solvents for preparing these dopes include fluorosulfuric acid and mixtures thereof with concentrated sulfuric acid (preferably 100–102%) in all proportions. Generally, these solvents are used at room temperature or below. However, some warming of the acids may be done to assist rapid dissolution of the added polymer or copolymer or to increase the fluidity of the dope.

Dope preparation

The dopes of this invention are prepared by combining under anhydrous conditions and with stirring and mixing, suitable quantities of the appropriate polymer or copolymer with the sulfuric acid to form compositions containing from about 10–20% by weight polymer or copolymer, preferably about 12–15% by weight. Generally, during addition of the polymer, the heat of mixing should be controlled in order that the temperature of the combined ingredients does not exceed 60° C., preferably not over 45° C. This may be accomplished by using cooled quantities of acid, application of external cooling baths to the mixing vessel, controlled rate of addition of the solid polymeric material, appropriate stirring action, and/or combinations of these procedures. However, in some instances, as illustrated in the examples which follow, it may be desirable to mix the ingredients with a moderate degree of heating in order to achieve more rapid dissolution of the polymeric solid. During preparation of the dope and the spinning thereof, the dopes should be maintained at temperatures which reduce the opportunity for polymer degradation to occur.

The water content of the dopes of this invention should be kept low, since excessive water can interfere with the formation of dopes suitable for spinning and can lead to degradation of the polymer.

Anisotropic character of the dopes

The solutions of this invention are optically anisotropic. Optical anisotropy is described in detail in Kwolek U.S. 3,671,542. The solutions of this invention which exhibit optical anisotropy do so while the solutions are in the relaxed state. This is in contrast to conventional polymer solutions which may be caused to depolarize plane-polarized light when subjected to appreciable shear.

There is a complex relationship existing among, e.g., the concentration of the particular polymer or copolymer species, the inherent viscosity thereof, the solvent system, and the solution temperature which generally determines the ranges in which a given solution is anisotropic or isotropic. A useful polymer concentration-solution viscosity relationship exists for given polymer-solvent combinations which are capable of forming the anisotropic solutions of this invention. For such combinations, the solution formed is isotropic when the polymer concentration is below a particular level. As the concentration of the polymer is increased, the viscosity of the solution increases. However, at a point referred to herein as the "critical concentration point" there is a sharp discontinuity in the slope of the viscosity v. concentration curve when the solution changes from isotropic to partially anisotropic without the formation of a solid phase. Further addition of polymer results in a decrease in the viscosity of the solution as it becomes more anisotropic. Illustrative viscosity v. concentration curves of this type are shown in Bair & Morgan U.S. 3,673,143 and Kwolek U.S. 3,671,542. The "critical concentration point" (as well as the complete viscosity v. concentration curve) is routinely determined using conventional concentration and viscosity measuring techniques as shown in such patents.

Another qualitative determination of the anisotropic character of these dopes may be made with the naked eye. These dopes may appear turbid or hazy and yet contain no, or practically no undissolved solid. When the dope, seen under reflected ordinary light, is disturbed by shaking or rolling the vessel containing the dope or by only slow stirring, there is produced a characteristic, readily observed, satin-like sheen or glow which is observed even after the disturbance ceases, and which decreases in intensity thereafter. This may be described as being a pearly or opalescent quality of the dope. Dopes which are disturbed as described above often give the appearance of having striations and/or graininess in the surface. These visual effects are observed in the anisotropic dopes of this invention. This may commonly be referred to as "stir opalescence." Further details on qualitative and quantitative determinations of optical anisotropy are presented in Kwolek U.S. 3,671,542. The latter patent describes the improved properties (e.g., higher tenacity and initial modulus) of fibers spun from anisotropic, rather than isotropic systems.

Shaped article preparation

The dopes of this invention may be formed into shaped articles, e.g., films, fibers, and fibrids. Useful films may be cast, using a variety of quenching media. Fibers of high quality may be prepared from these dopes by spinning them into suitable baths. Fibrids, useful for paper preparation, may be prepared from these dopes by means of the procedures described in Morgan U.S. 2,999,788, using a suitable coagulant.

The dopes of this invention may be spun into fibers by wet and "air-gap" spinning techniques, using spinnerets and other apparatus constructed of materials resistant to the strong acids used. In "air-gap" spinning the spinneret is located in air or in an inert gaseous medium a short distance (e.g., 0.1 to 10 cm., preferably from about 0.5 to 2 cm.) above the surface of a coagulating bath. A variety of baths may be used to coagulate the extruded dope into fibers. The baths may be, e.g., water or a dilute solution of sulfuric acid, as shown in the examples. Preferably, the temperature of a coagulation bath is room temperature or below.

It is desirable to completely remove the spinning solvent from fiber samples prepared from the dopes of this invention. Water alone or aqueous alkaline solutions may be used for removal of the residual acid. A convenient method is to spray the threadline as it leaves the coagulating bath with an aqueous alkaline solution (e.g., saturated sodium bicarbonate), remove the surface liquid from the threadline with a wiping device (e.g., a sponge) or a jet, wash with water to reduce the acid content, and wind up the fibers on bobbins. The fibers may be soaked in water for a period sufficient to remove the acid. The thoroughly washed fibers may be dried on the bobbin in the area of temperatures of up to about 110° C. They can also be conveniently dried on heated rolls.

It will be understood that the usual additives such as dyes, fillers, antioxidants, etc., can be incorporated into the dopes of this invention for the purposes intended, prior to shaped article preparation.

The fibers prepared from the acidic dopes of this invention exhibit high values of tensile properties, especially in the as-extruded state, i.e., without subsequent hot drawing or annealing. The tensile properties of the fibers prepared from the dopes of this invention can be improved by subjecting the undrawn fibers to a heat treatment in a manner generally described in Kwolek U.S. 3,671,542.

The as-extruded fibers of this invention, spun from the anisotropic dopes of Formula I polyamides and copolyamides, exhibit tenacity and initial modulus values (measured as described hereinafter) of at least 3.5 g.p.d. and 100 g.p.d., respectively, preferably of at least about 4.5 g.p.d. and 150 g.p.d., respectively. These as-extruded fibers exhibit orientation angles of less than about 40°.

The excellent properties of the fibers of this invention are particularly useful as reinforcing agents for plastic laminates, tire cords, V-belts, and the like.

MEASUREMENTS AND TESTS

Inherent viscosity: Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.5 gram of the polymer in 100 ml. of solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C), above; flow times are determined at 30° C.; the solvent is sulfuric acid (96–98% sulfuric).

Fiber tensile properties: Filament properties are measured on fibers that have been conditioned at 21° C. and 65% relative humidity (R.H.) for at least 16 hours unless otherwise specified. Yarn properties are measured on yarn that has been conditioned at 24° C. and 55% R.H. for at least 16 hours. All measurements are made in the fiber conditioning environment.

Tenacity (breaking tenacity) (T), elongation (breaking elongation) (E), and initial modulus (Mi) are obtained from breaking a single filament or a multifilament yarn on an Instron tester (Instron Engineering Corp., Canton, Mass.).

Single filaments are broken with a gage length (distance between jaws) of 1.0 inch (2.54 cm.). The results on 3 filaments are averaged. Yarns are given 3 turns per inch (2.54 cm.) twist (under 0.1 g.p.d. tension) and broken with a 10-inch (25.4 cm.) gage length. All samples are elongated at a constant rate of extension (10% elongation/minute for fibers having an E of under 8%, and 60% elongation/minute for fibers with E of 8 to 100%) until the sample breaks.

The denier of a single filament (d.p.f.) is calculated from its functional resonant frequency, determined by vibrating a 7 to 9 cm. length of fiber under tension with changing frequency. (A.S.T.M. D1577–66, part 25, 1968). This filament is then used for 1 break.

The denier of yarn is determined by weighing a known length (at 0.1 g.p.d. tension); 90 cm. length is convenient.

The tenacity (grams/denier), elongation (percent), and initial modulus (gram/denier) as defined in A.S.T.M. D2101, part 25, 1968 are obtained from the load-elongation curve and the measured denier. In actual practice, the measured denier of the sample, test conditions, and sample identification are fed to a computer before the start of a test; the computer records the load-elongation curve of the fiber as it is broken and then calculates the fiber properties.

It should be noted that different values are obtained from single filaments (filament properties) and from multifilament strands (yarn properties) of the same sample. Unless specified otherwise all properties given herein are filament properties.

EXAMPLE 1

This example illustrates the preparation of an anisotropic dope of poly(p-phenylene-p,p'-azodibenzamide) and the preparation of fibers therefrom.

To a stirred mixture of 80 ml. of HMPA and 40 ml. of NMP in a blender, under dry box conditions, is added p-phenylene-diamine (4.3 g., 0.04 mole). To this stirred solution is added p,p'-azobenzene dicarbonyl chloride (12.28 g., 0.04 mole). Almost immediately, the reaction mixture becomes an unstirrable paste which is left in the dry box for one hour. After the paste is combined with water, the solid material is collected, washed with water (3×) and acetone (1×), and dried at 80° C. in an oven. The yield of the above-identified polymer is 13 g., $$\eta_{inh}=2.8.8.$$

The spinning dope is prepared by first adding 12 g. of the above-prepared polymer to 88 g. of cold (ice-water) concentrated sulfuric acid (97%). After these ingredients are stirred for two hours, with cooling, a smooth fluid dope is obtained. The dope is strongly stir opalescent. A portion of the dope is wet spun via a motor-driven, syringe-type cell through a spinneret, having 20 holes of 0.002 inch diameter, each, into a coagulating bath of dilute sulfuric acid (10%) maintained at 35° C. The emerging fibers are wound up at the rate of 58 ft./min., soaked in water overnight, and dried in air. The dried filaments exhibit the following properties: T/E/Mi/Den.: 4.3/5.6/202/3.1; O.A.=29°. After these filaments are drawn 1.02× at 500° C. at the rate of 25 ft./min., observed T/E/Mi/Den. values are 7.8/2.2/377/2.6; O.A.=15°.

Another sample of the above-described dope is extruded, as above, into a water bath maintained at room temperature. After the fibers are washed and dried, they exhibit the following values for T/E/Mi/Den.: 5.1/6.2/200/4.5; O.A.=29°.

EXAMPLE 2

This example illustrates the preparation of poly(p,p'-carbonamidodiphenylene p,p'-azodibenzamide), together with an anisotropic dope and fibers thereof.

In a blender a solution is formed from p,p'-diaminobenzanilide (90.8 g., 0.004 mole), HMPA (100 ml.), and NMP (50 ml.). To this rapidly stirred solution is added p,p'-azodibenzoyl chloride (12.3 g., 0.04 mole). A difficultly stirrable red mass forms within a few minutes; this is left undisturbed for one hour. The reaction mixture is then combined with water to precipitate the polymer, which is collected, washed with water (3×) and 2B alcohol (1×) and dried in vacuo at 100° C. There is obtained 17.4 g. of polymer, $\eta_{inh}=3.90$.

A spinning dope containing 12% solids is prepared by first adding 6 g. of the above-prepared polyamide to 44 g. of ice-cooled, concentrated sulfuric acid (97% sulfuric). The ingredients are stirred for 5 hours (water cooling) until a thick, smooth, anisotropic dope results. This dope is spun into fibers by the apparatus described in Example 1. The dope is extruded into a room temperature water bath and the emerging fibers are wound up 26 ft./min. The fibers are washed in water overnight, then are dried in air. The following properties are observed: T/E/Mi/Den.: 7.1/7.2/189/4.1; O.A.=32°. After a fiber sample is drawn 1.05× at 500° C., the following properties are observed: T/E/Mi/Den.: 6.4/1.4/480/4.0;

O.A.=12°.

EXAMPLE 3

This example illustrates the preparation of copoly(p,p'-carbonamidodiphenylene terephthalamide/p,p'-azodibenzamide) (50/50), plus an anisotropic dope and fiber thereof.

In a blender (under dry box conditions) are placed p,p'-diaminobenzanilide (11.35 g., 0.05 mole), HMPA (110 ml.), and NMP (55 ml.). To the resulting suspension is added a mixture of terephthaloyl chloride (5.08 g., 0.025 mole) and p,p'-azobibenzoyl chloride (7.67 g., 0.025 mole). The clear solution which forms becomes a difficultly stirrable, clear gel within a minute. The gel is permitted to stand for one hour at room temperature, after which is it is combined with water to precipitate the copolymer which is collected, washed separately with water (3×) and acetone (1×), and dried in vacuo at 80° C.; $\eta_{inh}=4.2$. At a solids concentration of 10% by weight the copolyamide forms anisotropic dopes in 99.2% and 100.7% sulfuric acid.

A 12% spinning dope is prepared by first combining 10 g. of the above-prepared copolyamide with 73 g. of 100.7% sulfuric acid, using water cooling. After these ingredients are stirred 6 hours, a thick dope is obtained. This dope exhibits stir opalescence and depolarizes plane-polarized light when viewed through a polarizing microscope. The dope is extruded through the apparatus as described in Example 1 into a water bath maintained at 24° C. Emerging fibers are wound up at the rate of 64 ft./min., washed in water overnight, and dried in air. The following filament properties are observed: T/E/Mi/Den.: 7.5/9.4/171/4.1; O.A.=36°. After these fibers are drawn 1.33× at 475° C., the following filament properties are observed: T/E/Mi/Den.: 10.8/1.8/617/3.3; O.A.=11°.

EXAMPLE 4

This example illustrates the preparation of two samples of copoly(p-phenylene p,p'-azodibenzamide/terephthalamide) of different proportions: 91.1/8.9, 75/25. Some anisotropic dopes and fibers are prepared.

Part A

To a solution of p-phenylenediamine (1.08 g., 0.01 mole) in a mixture of HMPA (15 ml.) and NMP (15 ml.), cooled in solid carbon dioxide, is first added p,p'-azodibenzoyl chloride (0.27 g., 0.00088 mole), followed quickly by terephthaloyl chloride (1.82 g., 0.009 mole). The cooling bath is removed after 5 minutes. The reaction mixture becomes viscous and difficultly stirrable within about 30 minutes, and is permitted to stand overnight at room temperature. It is then combined with water to precipitate the copolymer which is collected, washed well with water, and dried in vacuo. There is obtained 3.45 g. of product, $\eta_{inh}=3.10$. A 15% by weight dope of this copolyamide in 101.057 sulfuric acid is anisotropic.

Part B

To a stirred solution of p-phenylenediamine (4.32 g., 0.04 mole) in a mixture of HMPA (60 ml.) and NMP (30 ml.) in a Waring Blendor is added, all at once, a mixture of terephthaloyl chloride (6.09 g., 0.03 mole) and p,p'-azodibenzoyl chloride (3.07 g., 0.01 mole). Within two minutes the reaction mixture becomes a thick paste. This is permitted to stand at room temperature for a time before being combined with water to precipitate the copolymer which is collected, washed with water (3×) and acetone (1×) and dried in vacuo at 80° C. There is obtained a quantitative yield of copolyamide, $\eta_{inh}=2.02$.

An anisotropic spinning dope (10% solids) is prepared by stirring a combination of 8 g. of the above-prepared copolyamide with 72 g. of 100.07% sulfuric acid, using ice-water cooling. In about 1 hour there is obtained a smooth, dark red anisotropic dope which exhibits strong stir opalescence and which depolarizes plane-polarized light when viewed through a polarizing microscope. This dope is extruded through the apparatus described in Example 1 into a water bath under varying conditions, e.g.:

| Spin | Bath temperature, °C. | Yarn windup speed, ft./min. |
|---|---|---|
| 1 | 4 | 15.5 |
| 2 | 22 | 52.5 |

The fiber samples are soaked in water overnight, then dried in air. Tensile and orientation properties for the filaments from spins (1) and (2), respectively, are: T/E/Mi/Den.: 3.7/10.2/144/2.9; O.A.=40°; 3.7/16.2/114/3.4, O.A=40°.

EXAMPLE 5

This example illustrates the preparation of poly(p,p'-azodiphenylene p,p'-azoxydibenzamide) and an anisotropic dope thereof.

In a tubular flask (equipped with a stirrer and openings for flushing with nitrogen and for introduction of materials) are placed 15 ml., each, of HMPA and NMP. After the stirred solvent mixture is cooled with solid carbon dioxide, p,p'-diaminoazobenzene (2.13 g., 0.01 mole) is added. To the resulting solution is added p,p'-azoxydibenzoyl chloride (3.23 g., 0.01 mole). The cooling bath is removed after five minutes and the viscous reaction mixture is permitted to stand for about 65 hours. Then, after the contents of the flask are combined with water, the solid material is collected, washed well with water, and dried in vacuo. The dried polyamide exhibits an inherent viscosity of 2.05. A 12% by weight dope of this polyamide 101.2% sulfuric acid is anisotropic (stir opalescent).

EXAMPLE 6

This example illustrates the preparation of poly(p,p'-azodiphenylene p,p'-azodibenzamide) and an anisotropic dope thereof.

The procedure of Example 5 herein is followed with the exception that the acid chloride used is p,p'-azodibenzoyl chloride (3.07 g., 0.01 mole) and that the reaction mixture is permitted to stand overnight before being worked up. There is obtained 4.4 g. of polyamide, $\eta_{inh}=1.07$. An 18% by weight dope of this polyamide in 99.9% sulfuric acid is optically anisotropic.

EXAMPLE 7

Illustrated herein is the preparation of poly(p-phenylene p,p'-azoxydibenzamide) and an anisotropic dope thereof.

To an ice-cooled, stirred solution of p-phenylenediamine (1.08 g., 0.01 mole) dissolved in 20 ml. of HMPA is added p,p'-azoxydibenzoyl chloride (3.23 g., 0.01 mole). After about 1 minute, the reaction mixture forms a smooth paste when stirred with a spatula. NMP (5 ml.) is added. After one hour a stoichiometric equivalent of lithium carbonate is added. After one additional hour the reaction mass is combined with water in a blender and stirred. The contents of the blender are filtered and the isolated solid is washed until free of solvent. The solid polymer is then washed with acetone and dried in vacuo at 80° C. for 72 hours. There is obtained 3.64 grams of polymer, $\eta_{inh}=2.39$. A 12% by weight dope of this polyamide in 101.47% sulfuric acid is anisotropic (stir opalescent).

EXAMPLE 8

This example illustrates the preparation of poly(p-cyclohexylene p,p'-azodibenzamide) and an anisotropic dope thereof.

In a Waring Blendor are placed trans-1,4-cyclohexanediamine (2.05 g., 0.018 mole), sodium carbonate (3.18 g., 0.03 mole), water (125 ml.), and CHCl$_3$ (38 ml.). To this stirred mixture is added p,p'-azodibenzoyl chloride (4.6 g., 0.015 mole) dissolved in CHCl$_3$ (75 ml.). The reaction is allowed to proceed for 10 minutes, after which the contents of the blendor are combined with n-hexane to precipitate the polymer which is collected, washed separately with water and with acetone, and dried in vacuo at 80° C. There is obtained 5.4 g. of polyamide, $\eta_{inh}=1.13$. A 10% by weight dope of this polyamide in 100% sulfuric acid is optically anisotropic.

EXAMPLE 9

This example illustrates the preparation of poly(p,p'-azodiphenylene terephthalamide) and anisotropic dopes thereof.

In a one liter resin kettle fitted with a stirrer and nitrogen flushing system are placed HMPA (250 ml.), NMP (250 ml.), and p,p'-diaminoazobenzene (42.6 g., 0.20 mole). To the stirred solution formed from these ingredients, cooled in a bath of solid carbon dioxide, is added terephthaloyl chloride (40.6 g. 0.20 mole). The reaction mixture becomes a viscous mass within 5 minutes. After the cooling bath is removed, the reaction mixture is stirred gently for one hour after which it is permitted to stand overnight at room temperature. After the reaction mixture is combined with water, the precipitated polymer is collected, washed well with water, and dried in vacuo. There is obtained 68.3 g. of polymer, $\eta_{inh}=2.02$. A 12% by weight dope of this polymer in 96% sulfuric acid is anisotropic, as is an 11% by weight dope in 101.2% sulfuric acid.

EXAMPLE 10

This example illustrates the preparation of copoly(p-phenylene/p,p'-azodiphenylene terephthalamide) (90/10) and an anisotropic dope thereof.

To a stirred solution (cooled in a bath of solid carbon dioxide) prepared by combining HMPA (15 ml.), NMP (15 ml.), p-phenylenediamine (0.97 g., 0.009 mole), and p,p'-diaminoazobenzene (0.21 g., 0.001 mole), is added terephthaloyl chloride (2.03 g., 0.010 mole). The cooling bath is removed after five minutes. The viscous reaction mixture becomes unstirrable within 30 minutes and is permitted to stand overnight. After the reaction mixture is subsequently combined with water, the precipitated copolyamide is separated by filtration, washed well with water, and dried in vacuo. There is obtained 2.96 g. of the above-identified copolyamide, $\eta_{inh}=2.48$. An anisotropic dope containing 16% solids is formed by combining a sample of this copolyamide with sulfuric acid (101.05% sulfuric), then warming and stirring the combined ingredients at 50° C. for one hour.

EXAMPLE 11

This example illustrates the preparation of poly(p,p'-azodiphenylene terephthalamide), together with anisotropic dopes and fibers therefrom.

Part A

In a one liter resin kettle fitted with a stirrer and nitrogen flushing system are placed HMPA (250 ml.), NMP (250 ml.), and p,p'-diaminoazobenzene (42.45 g., 0.02 mole). To the stirred solution, cooled with an ice-water bath, is added terephthaloyl chloride (40.60 g., 0.02 mole). The reaction mixture becomes a viscous solution within 15 minutes. The cooling bath is removed and the system becomes an unstirrable mass by the end of an hour of reaction time. The mixture is permitted to stand two hours more and is then combined with water with vigorous stirring. The precipitated polymer is collected, washed well with water, and dried in vacuo. There is obtained 69.0 g. of brown-colored polymer, $\eta_{inh}=2.64$.

An 11% anisotropic dope of this polymer is made in 99.69% sulfuric acid and wet spun into strong fibers. Spinning is carried out with the dope at room temperature. The spinneret (20 holes of 0.002 inch diameter, each) and water coagulating bath are at 24° C. The emerging fibers are wound up at 122 ft./min., soaked in three changes of water during a 30-hour period, and air dried. The filaments exhibit T/E/Mi/Den. values of 3.5/11.2/127/4.1.

In addition to the above dope, the polymer of this example is used to form an anisotropic dope in 50/50 (by weight) fluorosulfuric/sulfuric acid (100.03%) at 15% polymer content. The dope transmits light when viewed as thin layers between crossed polarizers.

Part B

To an ice-cooled, stirred solution of p,p'-diaminoazobenzene (21.21 g., 0.1 mole) in a mixture of HMPA (250 ml.) and NMP (250 ml.) in a 1-liter resin kettle is added terephthaloyl chloride (20.30 g., 0.1 mole).

Stirring is continued; after 15 minutes the cooling bath is removed. The viscous reaction mixture warms to room temperature and becomes difficultly stirrable within an hour. After 16 hours the reaction mixture is combined with water to precipitate the polymer which is collected, washed well with water and with methanol, and dried in vacuo at 80° C. There is obtained a quantitative yield of polymer, $\eta_{inh}=3.24$.

An anisotropic spinning dope (13% solids) is prepared by stirring together a combination of the above-described polyamide and 96% sulfuric acid. A portion of the dope is extruded through the spinneret described in Part A, above, with the face of the spinneret being positioned one-quarter inch above the surface of a coagulating bath (water) maintained at 0° C. The emerging fibers are wound up at speeds of from 595–1,000 ft./min., soaked for 24 hours in several changes of water, and dried in air. Dried filaments of fiber which is wound up at 825 ft./min. exhibit the following tensile properties: T/E/Mi/Den.: 6.98/4.87/331/1.54. A portion of this fiber is passed taut through a nitrogen-filled tube furnace maintained at 400° C. The heat treated fiber exhibits the following filament tensile properties: T/E/Mi/Den.: 6.9/1.8/412/1.61.

What is claimed is:

1. An anisotropic dope comprising from 10–20% by weight of a polyamide in concentrated sulfuric acid within the concentration range of about 96–104% $H_2SO_4$, said polyamide consisting essentially of recurring units of the formula:

—HN—R$_1$—NHCO—R$_2$—CO— wherein R$_1$ is a divalent organic radical selected from the group of 1,4-phenylene, trans-1,4-cyclohexylene, 4,4'-azodiphenylene, 4,4'-azoxydiphenylene, and 4,4'-carbon-amidodiphenylene; R$_2$ is a divalent organic radical selected from the group of 1,4-phenylene, trans-1,4-cyclohexylene, 2,5-pyridylene, 4,4'-azodiphenylene, and 4,4'-azoxydiphenylene; at least one of R$_1$ and R$_2$ being a radical selected from the group of 4,4'-azodiphenylene and 4,4'-azoxydiphenylene.

2. The dope of claim 1 wherein the polyamide is poly(p-phenylene p,p'-azodibenzamide).

3. The dope of claim 1 wherein the polyamide is poly(p,p'-azodiphenylene terephthalamide).

4. An anisotropic dope comprising a polyamide in concentrated sulfuric acid within the concentration range of about 96–104% $H_2SO_4$, said polyamide consisting essentially of recurring units of the formula:

—HN—R$_1$—NHCO—R$_2$—CO— wherein R$_1$ is a divalent organic radical selected from the group of 1,4-phenylene, trans-1,4-cyclohexylene, 4,4'-azodiphenylene, 4,4'-azoxydiphenylene, and 4,4'-carbon-amidodiphenylene; R$_2$ is a divalent organic radical selected from the group of 1,4-phenylene, trans-1,4-cyclohexylene, 2,5-pyridylene, 4,4'-azodiphenylene, and 4,4'-azoxydiphenylene; at least one of R$_1$ and R$_2$ being a radical selected from the group of 4,4'-azodiphenylene and 4,4'-azoxydiphenylene, and wherein up to about 90 mol percent of the azo and/or azoxy linked groups representing R$_1$ and R$_2$ may be replaced by members selected from the group of 1,4-phenylene; 4,4'-biphenylene; 1,4-, 1,5-, and 2,6-naphthalene which may bear chloro, bromo, and fluoro atoms or methyl or methoxy radicals.

References Cited
UNITED STATES PATENTS

| | | | |
|---|---|---|---|
| 3,697,487 | 10/1972 | Bach | 260—47 CZ |
| 3,501,444 | 9/1970 | Bach | 260—78 |
| 3,637,534 | 1/1972 | Bach | 260—2 R |
| 3,642,709 | 2/1972 | Agolini | 260—78 R |
| 3,660,361 | 4/1972 | Bach | 260—78 R |
| 3,598,768 | 9/1971 | Bach | 260—2 R |
| 3,671,542 | 6/1972 | Kwolek | 260—30.8 R |

MORRIS LIEBMAN, Primary Examiner

R. ZAITLEN, Assistant Examiner

U.S. Cl. X.R.

260—78 R